United States Patent [19]

Scherr

[11] Patent Number: 4,583,905
[45] Date of Patent: Apr. 22, 1986

[54] AUGER APPARATUS FOR DISCHARGING MATERIAL FROM A TRUCK BOX

[76] Inventor: Mike Scherr, General Delivery, Unity, Saskatchewan, Canada

[21] Appl. No.: 616,710

[22] Filed: Jun. 4, 1984

[51] Int. Cl.⁴ ............................................. B60P 1/04
[52] U.S. Cl. .................................. 414/505; 198/668; 414/519; 414/523; 414/526
[58] Field of Search ............... 414/501, 502, 503, 504, 414/505, 519, 520, 523, 526, 328; 198/583, 584, 666, 668; 222/318

[56] References Cited

U.S. PATENT DOCUMENTS

| | | | |
|---|---|---|---|
| 2,613,004 | 10/1952 | Kane | 414/505 |
| 2,772,767 | 12/1956 | Seifert | 414/523 X |
| 2,883,076 | 4/1959 | Palmer | 414/502 X |
| 3,331,519 | 7/1967 | Jennings, Jr. | 414/505 X |
| 3,391,778 | 7/1968 | Lasiter | 414/504 X |
| 3,391,812 | 7/1968 | Heider | 414/519 X |
| 3,568,867 | 3/1971 | Sammarco et al. | 414/505 |
| 3,638,816 | 2/1972 | Mann | 414/504 |
| 3,717,272 | 2/1973 | Chartier et al. | 414/526 X |
| 3,719,268 | 3/1973 | Koehnen | 198/632 |
| 4,419,037 | 12/1983 | Niewold | 414/523 X |

Primary Examiner—Robert J. Spar
Assistant Examiner—Stuart J. Millman
Attorney, Agent, or Firm—Stanley G. Ade

[57] ABSTRACT

An apparatus for discharging material from the tail gate of a truck box comprises a first auger mounted on the tail gate. A second auger can be coupled to the first and is movable between a stored position and a position extending from one side of the truck by a pivot arrangement between the two augers. A third auger arrangement can replace the second auger and is movable between a first stored travelling position to a second working position providing an alternative path for the material by which the material can be discharged from a high point. Details of the couplings between the folded portions of the augers are disclosed.

3 Claims, 4 Drawing Figures

AUGER APPARATUS FOR DISCHARGING MATERIAL FROM A TRUCK BOX

BACKGROUND OF THE INVENTION

This invention relates to apparatus for discharging material from the tail gate of a truck box. Truck boxes are known for transporting very many widely different types of material of different flowable properties and different end uses. In addition, such end uses require the provision of apparatus for discharging the material from the truck box to different positions, different orientations and in different ways.

In grain farming there are two particular materials and end uses which require transportation. Specifically such truck boxes are required to transport harvested grain and to deliver the grain in such a way that it can be collected by an auger for deposit in a storage container. In an alternative function, the truck box is used for delivering seed to seed drills. In this function, the material needs to be delivered at a high location so as to be dropped into the seed drill container. Augers are available separate from the truck for transporting such delivered material into the location required for use or storage but these separate apparatus are disadvantageous in that they need to be located at the delivery point thus causing great inconvenience if they are not available as and when required.

It is also known to provide apparatus mounted upon the truck box to assist in delivering the material. Particularly, it is known to mount augers on the rear portion of the truck box. However, these have been disadvantageous in that they are very limited in the way they can deliver the material and hence have not been satisfactory.

SUMMARY OF THE INVENTION

It is one object of the invention therefore to provide an apparatus for discharging material from the tail gate of a truck box for delivery at ground level and at high level so that the truck box can be used for various requirements and the material delivered properly for those requirements without the disadvantage of having to wait for or fetch suitable delivery apparatus.

Accordingly the invention provides an apparatus for discharging material from the tail gate of a truck box for delivery at ground level and at high level comprising a first auger, means for mounting the first auger on the tail gate, means for driving the first auger to discharge material from the truck box, a second auger, cooperating coupling means arranged partly on said first auger and partly on said second auger for detachably coupling the second auger to the first auger in an orientation to deliver material discharged from the truck at ground level, a third auger, coupling means on said third auger for detachably coupling the third auger to the part of the coupling means on the first auger in the place of the second auger with said second auger removed, the third auger being arranged to transport discharged material from said first auger to a high level for discharge.

It is one advantage of the present invention that the delivery augers can be pivoted into a stored position for travelling so that they can travel with the truck box without causing unacceptable obstruction.

It is a further advantage of the invention that it makes use of hydraulic orbital motors thus using hydraulic pressure readily available on the truck.

It is a yet further advantage of the invention that it provides a drive coupling between the hinge parts of the augers including shear pins so that any blockage or jamming of the augers does not cause severe damage.

It is a yet further advantage of the invention that the apparatus can be removably mounted in the sliding door section of the tail gate of the truck box whereby it can be readily removed when not required.

A further advantage is that the apparatus includes two gates arranged such that the first gate acts on the material between the truck box and the auger and the second gate when opened, allows the material to pass straight through the auger for discharge directly from the tail gate.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

BRIEF DESCRIPTION OF THE INVENTION

In the drawings like characters of reference indicate corresponding parts in the different figures.

DETAILED DESCRIPTION OF THE INVENTION

Figure 1:
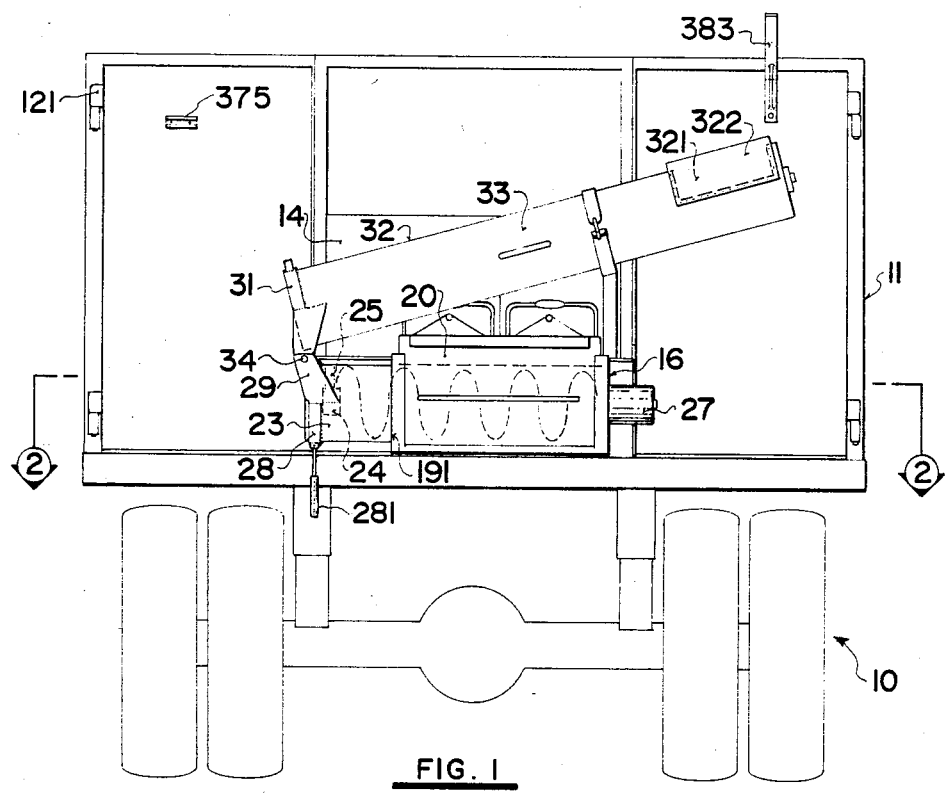
FIG. 1 is a rear elevational view of a truck with a truck box and discharge apparatus according to the invention.
Figure 2:
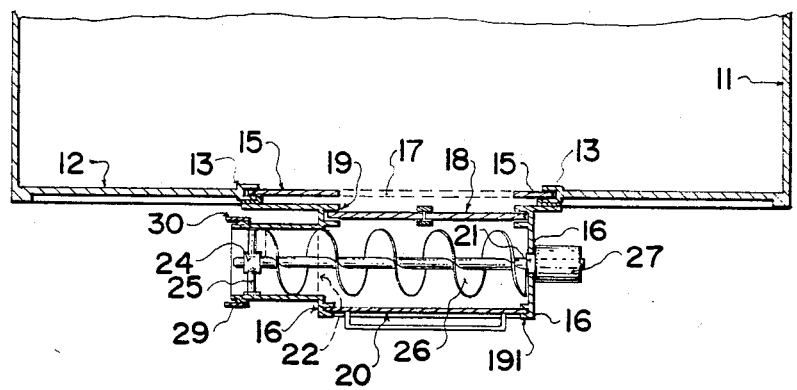
FIG. 2 is a cross sectional view along the lines 2—2 of FIG. 1.

Referring firstly to FIGS. 1 and 2, there is schematically and generally indicated a truck 10 having a truck box 11 for receiving bulk material particularly grain. As it is well known the truck box 11 has a tail gate or end gate 12 which may be mounted on pins 121 (shown in FIG. 1 but omitted from FIG. 2 for convenience of illustration) at its sides so that it can be removed to allow the escape of material particularly when the front end of the truck box is lifted by the conventional hydraulic lift. Many such tail gates also incorporate a sliding door in the center section which closes an opening in the lower half of the center section and can be slid upwards to expose the opening and allow the escape of the material. In this case, the slideways for the door are indicated at 13 and the door in partly raised condition is indicated at 14. As the door is partly raised leaving an opening there are portions available of the slideways 13 and in these is received a plate member 15 which provides two flanges each of which engages a respective one of the slideways 13 which flanges are coupled to a frame 16 thus holding the frame and flanges rigid within the slideways 13 while leaving an opening 17 communicating with the opening in the tail gate and thus with the material in the truck box. A movable sheet 18 slidably mounted between each of the flanges 15 and guides 19 normally closes the opening 17 to prevent the exit of materials in the truck box. The sheet 18 is divided into two halves so that it can be used with a truck box which is divided longitudinally to discharge either or both of two different materials in the two separated parts of the truck box.

The framework 16 defines a rectangular box extending outwardly from the flanges 15 so as to cover the extent of the opening 17 in a direction outward of the tail gate. The surface of the rectangular box 16 parallel to and remote from the tail gate carries further slide guides 191 which define slideways for a further door 20 parallel to the door 18 and movable upwardly so as to define with the door 18, a channel through the box 16 so the material within the truck can be discharged directly through the opening 17 and through the box 16 onto the ground beyond the tail gate. Normally the doors 18 and 20 are maintained closed so as to retain the material within the truck box.

In one side wall of the rectangular box 16 is mounted a bearing member 21 for receiving a shaft 251. Co-axially therewith in the opposite wall of the box 16 is an opening 22 into a cylindrical duct 23 which is supported from the wall of the box 16. The duct 23 carries a second bearing member 24 on supporting arms 25 extending from the inner wall of the duct 23. The bearings 21 and 24 support the elongate shaft 251 which extends through the box 16 and the duct 23 and carries the helical flight 26 of a conventional auger. The shaft 251 carries a motor 27 of the known orbital type which is driven by hydraulic pressure supplied from the truck.

Thus it will be appreciated that with the door 18 opened and the door 20 closed material from the truck box enters the box 16 and encounters the auger 26. Thus rotation of the auger driven by the motor 27 will act to transport material from the box 16 to the exit end of the duct 23.

The duct 23 adjacent its exit end carries a collar 28 forming part of a coupling which comprises the collar, two flanges 29 and 30 carried by the collar and a cooperating collar 31 provided on the duct 32 of a second auger 33. The collars 28 and 31 thus have cooperating flanges through which pass respective pivot pins (one shown at 34) so that the auger 33 can be pivoted relative to the auger 26 from a first position shown in FIG. 1 to a second position in which the open ends of the ducts 23 and 32 cooperate to form a continuous duct. In this position, the ducts can be locked in place by an overcenter locking device 281.

It will be appreciated that the duct 32 is movable therefore, from the position shown in FIG. 1 which is a stored travelling position to a working position in which the augers 26 and 33 extend in a substantially horizontal straight line to one side of the truck so that material can be delivered from the truck box by the augers 26 and 33 to one side of the truck. For this reason, the duct 32 has an opening 321 at its remote end, which opening 321 is guarded by depending side panels 322. In the stored position, it will be noted that the apparatus provides no obstruction hindering transport of the truck.

Figure 3:
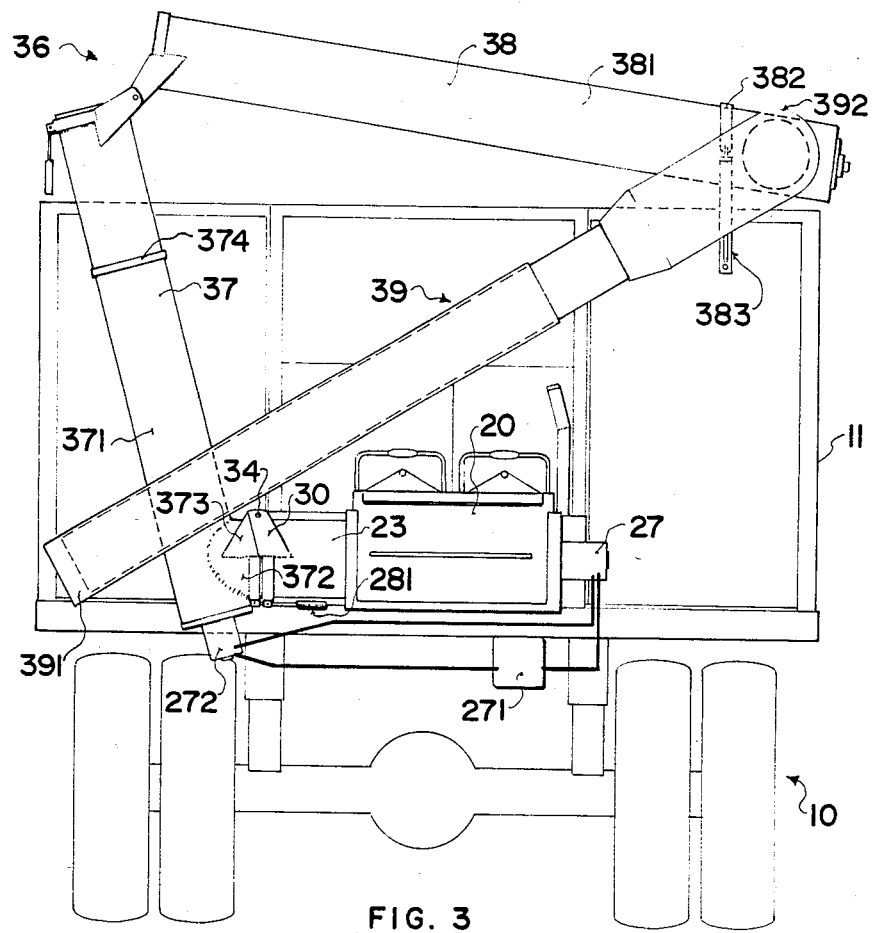
FIG. 3 is a view of the same truck box and apparatus as that shown in FIG. 1 with the second auger replaced by the third auger.

Referring now to FIG. 3, there is shown the same truck and attachments as that shown in FIG. 1 up to and including the collar 28, flanges 29 and 30 and pivot pin 34 of FIG. 1. The apparatus includes a third auger schematically indicated at 36 which comprises a first portion 37, a second portion 38 and a third portion 39. The first portion 37 comprises a duct 371 including a junction portion 372 arranged as an angle thereto so as to abut the end of the duct 23 while maintaining the duct 371 at a suitable angle so that it extends from the end of the duct 23 to a position adjacent the top left hand corner of the tail gate. The connection portion 372 carries a collar and flange arrangement 373 symmetrical to the collar and flange arrangement 28, 29, 30 so that the flanges can cooperate with the pivot pin 34 to support the duct 371 in the stated position. The duct 371 can be readily removed from and replaced onto the duct 23 by disconnection of the pivot pins 34 and 35. When removed, the second auger 33 can be positioned on the duct 23 in its stead which in turn can be readily removed for application of the third auger 36.

The duct 371 is supported in position as shown by a collar 374 which provides a strap (not shown) for coupling with a loop 375 provided adjacent the top left hand corner of the tail gate and shown in FIG. 1.

The portion 38 of the auger 36 comprises a duct 381 for cooperation with the duct 371. Couplings exactly similar to those used between the augers 26 and 33 of FIG. 1 are used between the ducts 371 and 381 and corresponding augers so that in similar fashion the duct 381 can be pivoted from the position shown in FIG. 3 which is a stored travelling position to a second locked position in which the ducts 371 and 381 extend in a straight line upwardly at a slight angle to the vertical to a high position substantially above the group and above the truck box and spaced slightly sideways of the truck box so that the portion 39 can depend vertically toward the ground. The auger of the duct 381 terminates at the upper end of the portion 38 whereat the portion 39 is coupled by a flexible rubber coupling 392 so that material carried up the portion 38 by the auger 381 is ejected into the portion 39 for delivery to a lower collection point. As schematically indicated at 391, the portion 39 includes a telescopic extension by which the material can be delivered to any convenient location.

The duct 381 is supported in its stored position shown in FIG. 3 by a collar 382 coupled to a metal support 383 by a strap.

Figure 4:
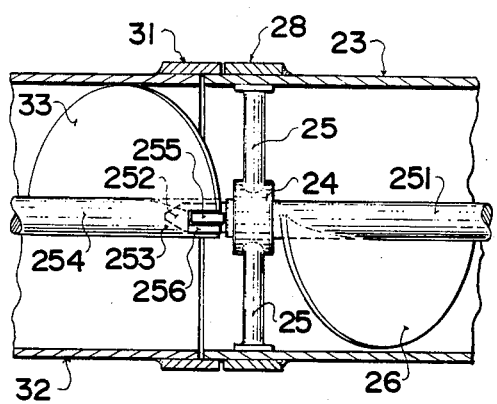
FIG. 4 is a schematic cross sectional view through the coupling between the augers showing particularly the drive coupling.

Referring now to FIG. 4, the abutting ends of the ducts 32 and 23 are shown with the flanges 29 and 30 omitted for sake of simplicity. The shaft 251 of the duct 23 is shown mounted on the bearing 24, the shaft 251 including a conical male portion 252 extending beyond the end of the duct 23 for cooperation with a corresponding female portion 253 in the shaft 254 of the auger 33. Thus the portion 252 and cooperating portion 253 provide a centering arrangement for the auger 33 so that the shaft 254 is effectively carried upon the bearings 24 and a second bearing adjacent the other end of the duct 32 (not shown). A flange 255 is fixed to the shaft 251 for cooperation with a flange 256 carried on the portion 253 so that drive from the shaft 251 is communicated to the shaft 254. In order to prevent damage to the augers or the drive motor on blockage or jamming of the auger 33, one or both of the flanges 255, 256 is shearable on excess load.

A motor 272 of the orbital type is coupled in series with the hydraulic supply to the motor 27 from the truck. The supply is schematically indicated at 271. The motor 272 is coupled to the shaft (not shown) of the auger of the duct 371 so as to drive in use the augers in the ducts 371, 381 mounted on suitable bearings (not shown).

Thus it will be appreciated that in use, the third auger can be moved from the position shown in FIG. 3 which is a stored travelling position to a work position in which the augers 371, 381 extend in a straight line substantially vertically to a position high above the ground and above the truck box and extending slightly to one side of the truck box. The flexible coupling between the portion 39 and the portion 38 allow the portion 30 to depend vertically from the end of the portion 38 towards the ground. Thus material delivered from the truck box by the auger 26 is lifted by the augers 371, 381 to the rubber coupling portion from which they can be delivered to a lower container via the portion 39. This is particularly useful for the containers of seed drills which are roughly at the same elevation as the truck box.

Since various modifications can be made in my invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. Apparatus for discharging material from the tail gate of a truck box for delivery at ground level and at high level as a drill fill comprising a first auger, means for mounting the first auger on the tail gate, so as to extend therefrom in horizontal orientation across a rear face of the tail gate, the first auger having a length such that it extends only across a central discharge portion of the tail gate and terminates at an open mouth substantially adjacent one side edge of the discharge portion of the tail gate, hydraulic drive motor means for driving the first auger to discharge material from the truck box to the open mouth, a second auger, cooperating pivot coupling means having a part on said first auger and a part on said second auger for detachably coupling the second auger to the first auger so as to extend therefrom in the horizontal orientation to deliver material discharged from the truck at ground level, the length of the second auger being such that it extends from the open mouth to a position just beyond the side edge of the truck box, said coupling means being arranged whereby the second auger can be folded back over the first auger, said second auger including drive engaging means for engaging said first auger whereby drive from said first auger is communicated to said second auger, a third auger separate and distinct from said second auger, coupling means on said third auger for detachably coupling the third auger to the part of the coupling means on the first auger in the place of the second auger with said second auger removed, the third auger forming a drill fill to transport discharged material from said first auger to a high level for discharge, said third auger comprising a first portion for extending upwardly and outwardly from said open mouth to a first upper rear corner of said truck box, a second portion pivotally coupled to the first portion and movable from a working position aligned with and driven by the first portion to a transport position inclined tranverseley thereto to a second upper rear corner opposite to said first rear corner of the truck box, and a discharge spout pivotally mounted on an end of said second portion remote from said first portion so as to be movable in said tranport position to a position inclined transversely and downwardly of said truck box to a lower rear corner below said first upper rear corner and hydraulic drive motor means for driving said third auger at an end thereof adjacent the open mouth of the first auger.

2. Apparatus according to claim 1 for use with a truck of the type having a tail gate in which a separate sliding door is provided wherein the mounting means for the first auger includes a plate member for being received in the sliding guides for said sliding door.

3. Apparatus according to claim 1 including a movable sheet arranged to gate material from the truck box to the first auger and a second movable sheet arranged to gate material from the auger whereby, with both movable sheets opened, material can pass directly through the auger from the truck box for discharge.

* * * * *